United States Patent Office 3,565,747
Patented Feb. 23, 1971

3,565,747
LAMINATES OF METAL AND OLEFIN POLYMERS HAVING FINELY DIVIDED, SOLID, NON-DEFORMABLE, ORGANIC POLYMER PARTICLES THEREIN
Gerald G. Vincent and Frank L. Saunders, Midland, Mich., assignors to The Dow Chemical Company, Midland, Mich., a corporation of Delaware
No Drawing. Original application Aug. 27, 1965, Ser. No. 483,308. Divided and this application June 2, 1969, Ser. No. 843,261
Int. Cl. B32b 15/08, 27/20; C08f 41/12
U.S. Cl. 161—162                                          4 Claims

ABSTRACT OF THE DISCLOSURE

A laminate having improved bond strengths and adhesiveness comprises one metal substrate such as aluminum bonded to a layer of an olefin polymer such as polyethylene. The olefin polymer has between about 25 and about 80 percent by weight solid, non-deformable, organic polymer particles having a diameter of less than about 20 microns. The organic polymer particles have a melting point higher than the melting point of the olefin polymer, are substantially non-adherent to the olefin polymer and to themselves, and are free of reactive groups such as carboxyl, hydroxyl, nitro, amine, and the like.

---

The present application is a divisional of application Ser. No. 483,308 filed Aug. 27, 1965, now abandoned.

The present invention relates to olefin polymers and fillers therefor. More particularly, it relates to olefin polymers having interspersed therein, solid, nondeformable organic particles and laminated articles produced therefrom.

It is known in the art to incorporate fillers into polymers for a variety of reasons such as to extend the polymer and make its use more economical. Generally, the art has been limited to using inorganic fillers such as metal powders, asbestos, glass powders and the like to achieve this end.

It has now been found that olefin polymers with improved properties can be obtained by incorporating therein, solid, non-deformable organic particles, preferably as small beads. The resulting composition has advantages such as, greater rigidity and better adhesive properties over polymers containing inorganic fillers previously employed in the art. For example, a metal substrate having the above composition coated thereon results in a laminated product lighter in weight than similar laminates employing polymers containing inorganic fillers such as metal and glass powders.

The composition of the present invention is accomplished in a method which comprises (1) blending together an olefin polymer and finely divided, solid, non-deformable organic particles (2) heating the resulting mixture to a temperature above the softening point of the polymer and (3) cooling the resulting polymer-particle mixture.

By the term "non-deformable organic particle" is meant organic particle compositions (1) having a melting point higher than that of the base polymer into which it is incorporated, (2) being non-adherent to the base polymer and also to itself and (3) containing no reactive groups such as carboxyl, hydroxyl, nitro, amine, etc. It is preferred that the particle have a spherical or bead shape.

Polymers which may be employed in the present invention comprise olefin polymers such as, for example, polyethylene, polypropylene, polybutene-1, poly(4-methyl-1-pentene) and the like and also copolymers of olefins such as copolymers of ethylene and propylene, ethylene and acrylic acid and the like.

It has been found that if finely divided, solid, non-deformable organic particles are compounded into an olefin polymer, such as by means of a milling process, in amounts of from about 25 to about 80 percent by weight based on the weight of the total mixture and the mixture is heated to a temperature above the melting point of the polymer, the resulting composition has a substantially higher degree of adhesiveness than the olefin polymer without the organic filler. Organic fillers which may be employed in the present invention include those compositions which retain their individual particle shape after being compounded into the olefin polymer and which do not adhere to the polymer itself. Specific examples include cross-linked copolymers such as copolymers of styrene and divinyl benzene, preferably prepared by suspension polymerization, and copolymers of methyl methacrylate and divinyl benzene; cured epoxide compositions such as those made from epichlorohydrin and bisphenol A, from epichlorohydrin and phenolformaldehyde, and from epichlorohydrin and polyglycols; cured polyesters such as ethylene glycol maleate, propylene glycol maleate, ethylene glycol fumarate, propylene glycol fumarate and the like. The particles should have a size of less than 20 microns and preferably less than 17 microns in diameter.

The polymer-organic particle composition of the present invention may be employed to produce polymer-metal laminates, wherein the particular construction offers advantageous properties such as improved adhesion of the filled polymer to the metal substrate.

Polymer-metal laminate constructions employing the particular polymer-organic particle composition of the present invention may be prepared by a method which comprises (1) contacting at least one metal substrate with an olefin polymer composition of the kind described having interspersed therein from about 25 to about 80 percent by weight based on the weight of the total composition of finely divided, solid, non-deformable organic particles, (2) subjecting the polymer-metal combination to temperatures of from about 160° C. to about 225° C., preferably from about 170° C. to about 200° C. and pressures of at least 50 p.s.i. for a time sufficient to cause the copolymer composition to become bonded to the metal substrate and (3) cooling the resulting laminate.

The metal substrates that may be employed in the invention include aluminum, copper, steel, tin plate, and the like. Non-metal substrates such as glass and wood may also be used in the invention. The substrates may be surface-treated by conventional means to gain additional adhesion of the polymer to the metal surface where additional bond strength is desired.

The following examples are illustrative of the invention and are not intended to limit the scope thereof.

EXAMPLE 1

Twenty-five grams of high density polyethyleneacrylic acid graft copolymer containing 6.9 percent acrylic acid and having a melt index of 0.91 was dry blended with 25 g. of cross-linked copolymer beads of styrene and divinyl benzene, prepared by suspension polymerization, in a Thropp Mill at a temperature of about 180° C. The suspension beads contained 8 percent divinyl benzene and had a particle size of 8.0 microns.

A 15 g. portion of this blend was compression molded in a hydraulic press under a pressure of 10,000 lbs. platen and a temperature of 180° C. for 1 minute yielding a film approximately 0.01 inch in thickness. The film was placed on a 6" x 8" x 0.0045" piece of soft annealed aluminum foil and placed in a hydraulic press under a pressure of 10,000 lbs. and at a temperature of about 180° C. for a period of 2 minutes. The bonded product was cooled in the press, removed and tested according to ASTM D 903–49 peel test except that a cross-head separation rate of 4 inches per minute was used. The test specimen had a peel strength of 16.7 lbs./in. width whereas a control test having the graft copolymer bonded to the same kind of aluminum foil without the styrene divinyl benzene cross-linked beads had a peel strength of 6–8 lbs./in. width.

EXAMPLE 2

The procedure of Example 1 is substantially repeated except that similar beads of a cross-linked copolymer of methyl methacrylate and about 7 percent divinyl benzene were substituted for the cross-linked styrene-divinyl benzene beads. The peel strength of the resulting laminate was 11.5 lbs./in. width.

EXAMPLE 3

The procedure of Example 1 was substantially repeated except that (1) high density polyethylene having a melt index of about 3.0 was substituted for the graft copolymer in making the blend with the cross-linked styrene-divinyl benzene copolymer beads, and (2) the aluminum foil was pre-treated for 5 minutes at 80° C. in an aqueous solution of 5 percent chromium trioxide and then for 2 minutes at 80° C. in an aqueous solution of 5 percent maleic acid before bonding the polyethylene composition to the aluminum. The peel strength of the resulting laminate was 27.5 lbs./in. width whereas the peel strength of a similar laminate using the high density polyethylene without the styrene-divinyl benzene particles was 18 lbs./in. width.

EXAMPLE 4

The procedure of Example 3 was substantially repeated except that a copolymer of ethylene and propylene containing about 18 percent ethylene was substituted for the high density polyethylene. The peel strength of the resulting laminate was 10 lbs./in. width whereas a laminate of the copolymer without the organic filler had a peel strength of 1.0 lb./in. width.

In place of the particular olfin polymers and fillers employed in the foregoing examples, other olefin polymers and organic fillers as hereinbefore defined are used with substantially the same results.

What is claimed is:

1. An article of manufacture comprising a laminate of at least one metal substrate bonded to a layer of an olefin polymer selected from the group consisting of polyethylene, polypropylene, polybutene-1, poly(4-methyl-1-pentene), copolymers of ethylene and propylene and copolymers of ethylene and acrylic acid, said layer of the olefin polymer having interspersed therein finely divided, solid, non-deformable, organic polymer particles in an amount from about 25 to about 80 percent by weight based on the weight of the total composition, said particles having a size of less than 20 microns in diameter and having a melting point higher than the melting point of said olefin polymer and being substantially non-adherent to said olefin polymer and to themselves and being free of reactive groups.

2. The article according to claim 1 wherein the metal substrate is aluminum.

3. The article according to claim 1 wherein the olefin polymer is a graft copolymer of acrylic acid grafted onto high density polyethylene.

4. An article of manufacture comprising a laminate of at least one aluminum substrate bonded to a layer of a graft copolymer of polyethylene and acrylic acid, said copolymer having interspersed therein finely divided, solid, non-deformable beads of a cross-linked copolymer of styrene and divinyl benzene in an amount of about 50 percent by weight based on the weight of the total composition, said beads having a size of less than 20 microns in diameter and having a melting point higher than the melting point of said graft copolymer and being substantially non-adherent to said graft copolymer and to themselves and being free of reactive groups.

References Cited

UNITED STATES PATENTS

| | | | |
|---|---|---|---|
| 2,482,825 | 9/1949 | Amos et al. | 260—886 |
| 2,681,320 | 6/1954 | Bodamer | 260—897(m) |
| 3,185,569 | 5/1965 | Adams et al. | 161—216 |
| 3,211,808 | 10/1965 | Young et al. | 260—876(o) |
| 3,287,288 | 11/1966 | Reiling | 260—4 |
| 3,359,154 | 12/1967 | Clark | 161—216 |
| 3,468,753 | 9/1969 | Vincent et al. | 161—216 |

FOREIGN PATENTS

| | | | |
|---|---|---|---|
| 799,043 | 7/1958 | Great Britain | 260—892 |

JOHN T. GOOLKASIAN, Primary Examiner

G. W. MOXON II, Assistant Examiner

U.S. Cl. X.R.

117—132; 161—216; 260—876, 896, 897, 901